US008483059B2

(12) United States Patent
Likar et al.

(10) Patent No.: US 8,483,059 B2
(45) Date of Patent: Jul. 9, 2013

(54) METHOD FOR CONGESTION AVOIDANCE IN 4G NETWORKS

(75) Inventors: Bojan Likar, Ig (SI); Robert Posel, Ljubljana (SI); Andreas Kalagasidis, Ljubljana (SI); Janez Bester, Zg.Besnica (SI); Andrej Kos, Blejska Dobrava (SI); Mojca Volk, Bled (SI); Urban Sedlar, Bohinjska Bistrica (SI); Luka Mali, Novo mesto (SI); Janez Sterle, Ljubljana (SI)

(73) Assignee: Accelera Mobile Broadband, Inc., Santa Clara, CA (US)

( * ) Notice: Subject to any disclaimer, the term of this patent is extended or adjusted under 35 U.S.C. 154(b) by 318 days.

(21) Appl. No.: 12/882,333

(22) Filed: Sep. 15, 2010

(65) Prior Publication Data
US 2012/0063315 A1    Mar. 15, 2012

(51) Int. Cl.
*H04W 28/02* (2009.01)
*H04W 40/36* (2009.01)
*H04W 36/22* (2009.01)

(52) U.S. Cl.
USPC ........... 370/232; 370/237; 370/236; 370/254; 370/331; 455/432.1; 455/443; 455/445; 455/452.2

(58) Field of Classification Search
USPC ................. 370/229, 231, 232, 233, 234, 235, 370/236, 237, 254, 331; 455/422.1, 423, 455/432.1, 436, 443, 445, 450, 451, 452.1, 455/452.2
See application file for complete search history.

(56) References Cited

U.S. PATENT DOCUMENTS

| | | | | |
|---|---|---|---|---|
| 6,415,147 | B2 * | 7/2002 | Hayashi et al. | 455/433 |
| 6,738,350 | B1 * | 5/2004 | Gao et al. | 370/232 |
| 8,005,037 | B2 * | 8/2011 | Ishii et al. | 370/328 |
| 8,213,454 | B2 * | 7/2012 | Insler et al. | 370/445 |
| 8,260,357 | B2 * | 9/2012 | Likar et al. | 455/561 |
| 8,374,083 | B2 * | 2/2013 | Shi et al. | 370/230 |
| 2003/0035385 | A1 * | 2/2003 | Walsh et al. | 370/316 |
| 2007/0293235 | A1 | 12/2007 | Inayoshi et al. | |
| 2008/0130505 | A1 * | 6/2008 | Yoshimura et al. | 370/236 |
| 2009/0201810 | A1 * | 8/2009 | Kazmi et al. | 370/232 |
| 2009/0275343 | A1 * | 11/2009 | Monnes et al. | 455/453 |
| 2010/0002579 | A1 * | 1/2010 | Shi et al. | 370/229 |
| 2010/0216403 | A1 * | 8/2010 | Harrang | 455/41.3 |
| 2011/0093913 | A1 * | 4/2011 | Wohlert et al. | 726/1 |
| 2012/0026883 | A1 * | 2/2012 | Chu et al. | 370/235 |

* cited by examiner

*Primary Examiner* — Chi Pham
*Assistant Examiner* — Ahmed Elallam
(74) *Attorney, Agent, or Firm* — Van Pelt, Yi & James LLP

(57) ABSTRACT

This invention aims to avoid and resolve congestions in wireless 4G networks. The method is based on a central self-organizing network (SON) server, which dynamically changes neighbor lists on congested base station and on all base stations in vicinity. The procedure is triggered by measuring relative committed traffic rate and air interface utilization of the base station. When base station enters into congested state, it notifies the SON server. The SON server creates new neighbor lists for all base stations in the vicinity and removes the congested base station from these lists. With new neighbor lists propagated to mobile stations, the latter won't scan and initiate handovers to the congested base station. The SON server additionally creates a new dense neighbor list and changes handover triggers settings of the congested base station. The mobile stations consequently find other handover opportunities and connect to different base stations. As the air interface resources are released, the base station leaves the congested state.

14 Claims, 5 Drawing Sheets

METHOD FOR CONGESTION AVOIDANCE IN 4G NETWORKS

FIELD OF THE INVENTION

The present invention refers to a method for congestion avoidance in 4G networks.

BACKGROUND OF THE INVENTION

In a wireless network, the quality of the service is an important factor of user satisfaction. Due to the limited nature of the wireless spectrum, it is necessary to increase base station density in order to increase net throughput per user. In such an environment, automatic traffic congestion and avoidance and the self-healing nature of the wireless network become increasingly important.

Many techniques exist for avoiding interference on a single wireless link by preventing that different mobile terminals corrupt each other's transmitted signal by transmitting at the same time (TDMA, FDMA, CDMA, OFDMA, CSMA). In addition, directed links can be utilized, preventing the mobile stations from causing mutual interference.

However, these techniques lose their effectiveness if the number of mobile stations that wish to speak to the same base station at the same time increases over a certain threshold. Thus, to assure a satisfactory level of Quality of Service, the network is divided into geographically separate segments or cells, each being served by its own base station, which serve geographically localized mobile stations only.

To maximize net throughput per user, an operator must utilize a larger number of smaller cells, each serving a smaller number of mobile stations with higher net throughput per user. For that reason, the segments of 4G networks are much smaller than cells in traditional cellular networks and are consequently termed pico cells. Each pico cell is served by a pico base station.

In a network, covered by a high number of densely distributed base stations with partially or completely overlapping cells, it is crucial to automate the network operation and management. An important aspect of network management is congestion avoidance, which assures that no single base station is overloaded if there is available transmission capacity available that could be used to offload the congested base station. However, such high density of 4G networks at the same time increases the amount of handover events, where mobile station switches from one base station to the next.

The present invention describes a method for measuring relative committed traffic rate and air interface utilization, and on the basis of thus obtained results manages the base station neighbor lists, which are used by mobile terminals for base station selection.

Other similar inventions exist, such as US2007/0293235.

DETAILED DESCRIPTION OF THE INVENTION

Figure 1:
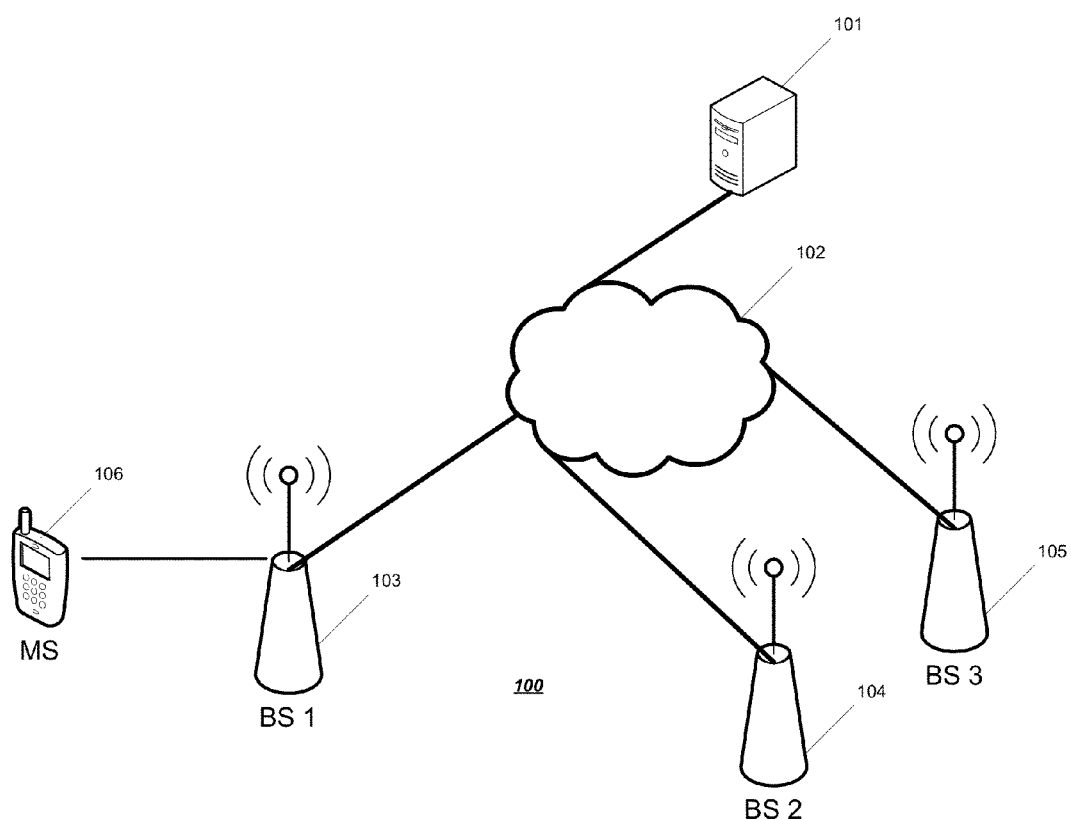
FIG. 1 shows a generalized 4G mobile network.
Figure 2:
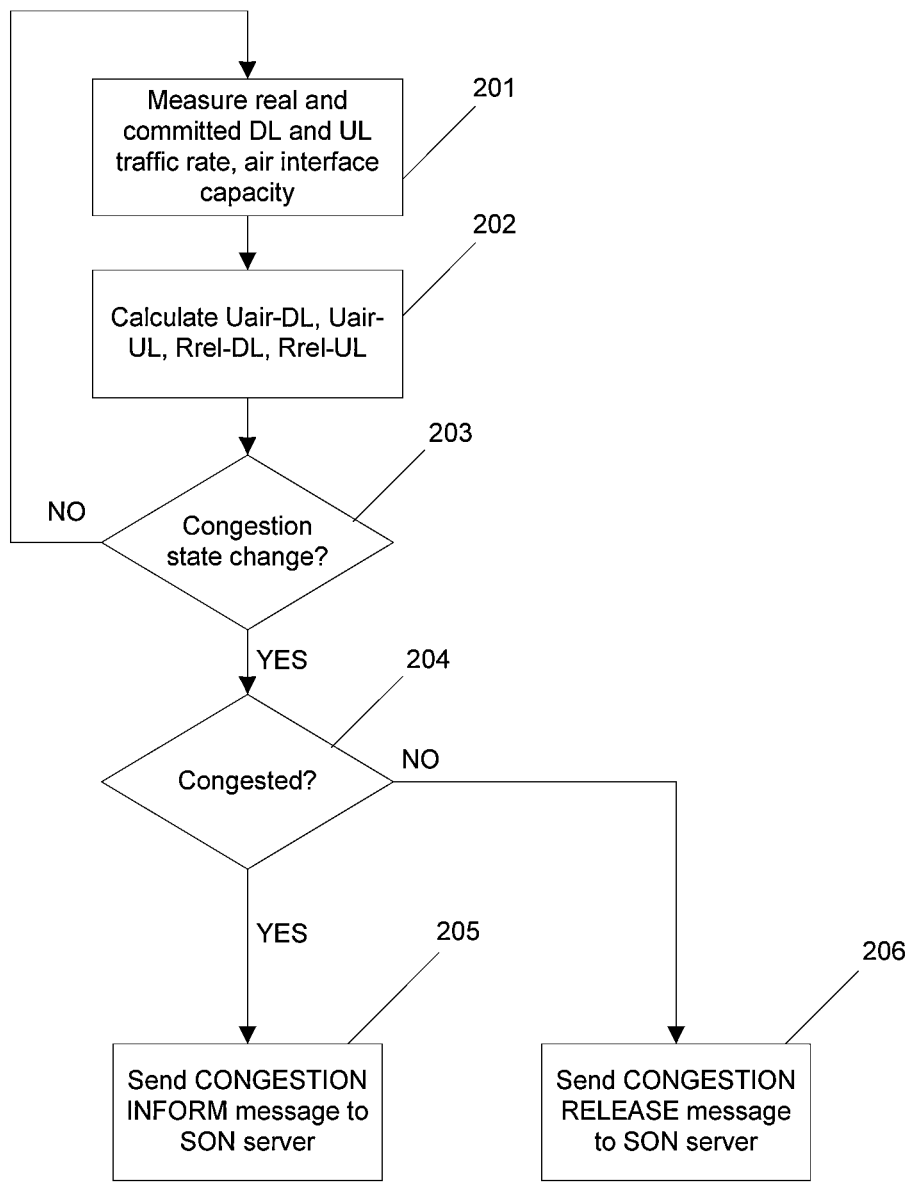
FIG. 2 shows a flow chart of the decision process regarding the congestion state of a BS, which takes place in the BS.
Figure 3:
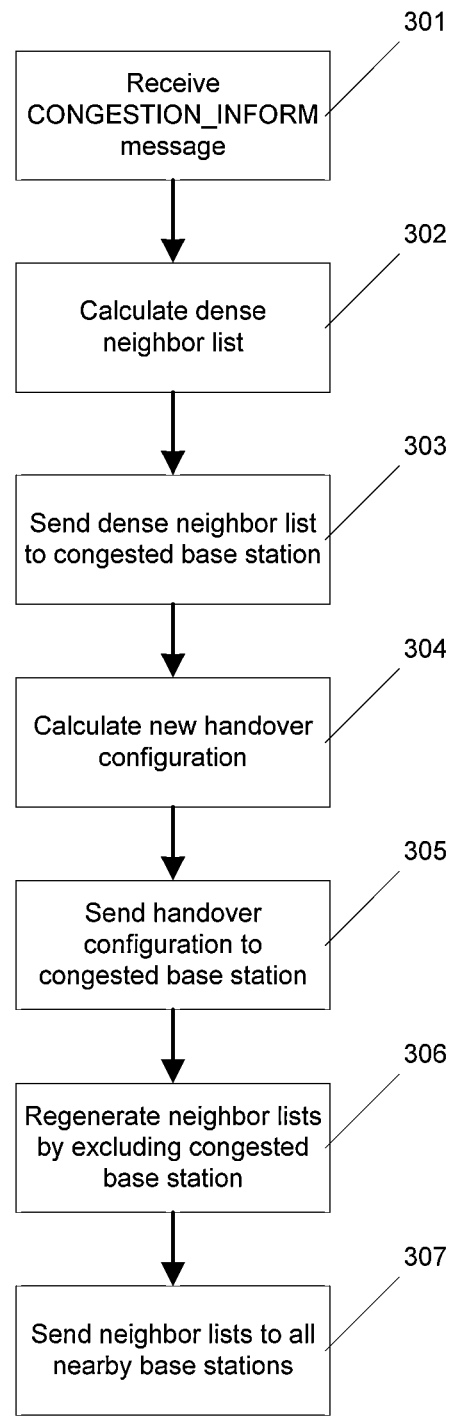
FIG. 3 shows a flow chart of the process taking place in the SON server upon receiving the notification of congestion from the BS.
Figure 4:
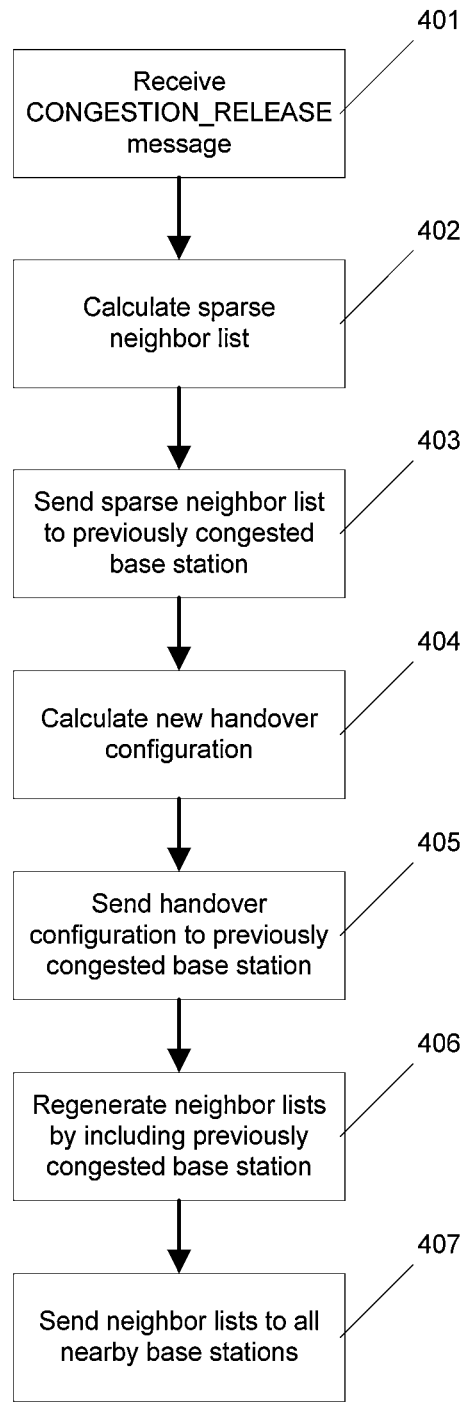
FIG. 4 shows a flow chart of the process taking place in the SON server upon receiving the notification of released congestion from the BS.
Figure 5:
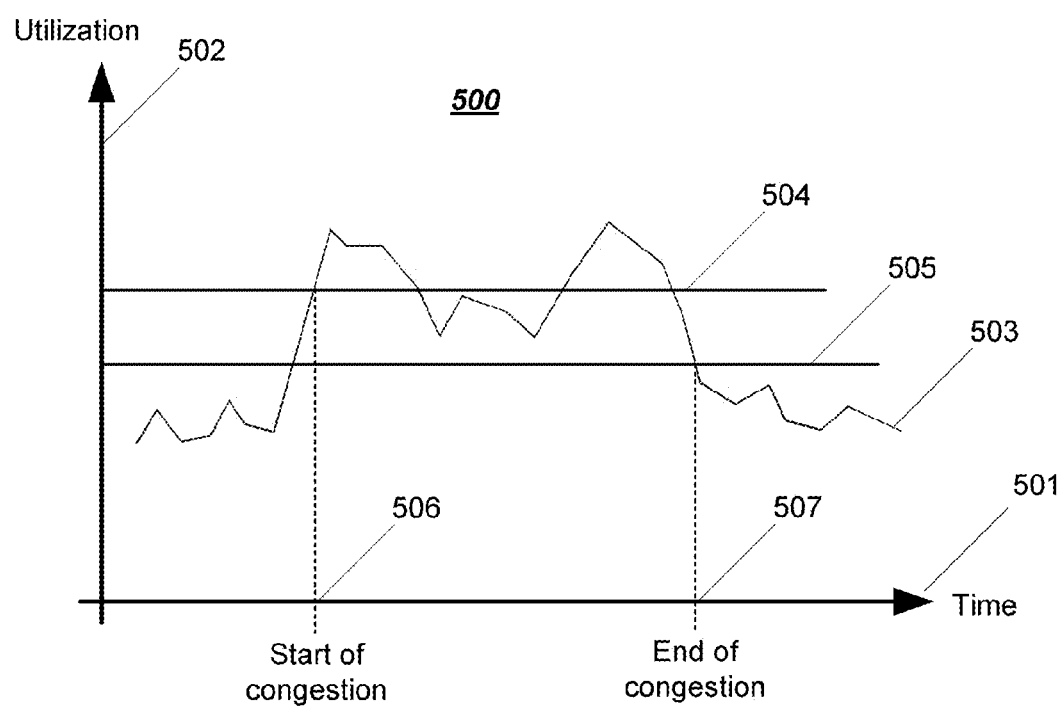
FIG. 5 shows a graph of a utilization metric, which shows the role of the hysteresis in determining the congestion state of the BS.

As mentioned above, FIG. 1 shows a generalized 4G mobile network, in particular a wireless system (100) comprising a self-organizing network (SON) server (101), self-organizing network (SON) agent, located on a base station (BS) (103), Neighboring base stations (104, 105) and mobile stations (MS) (106). The mobile stations connect to the base stations as a part of the normal operation routine. When so many mobile stations connect to a single BS that it prevents normal functioning of the BS, congestion occurs.

The method of congestion avoidance comprises the steps of congestion detection and congestion avoidance measures.

In the process of detecting congestion, a number of parameters are measured (201) by the base station. The parameters are:

Downlink air interface capacity at time t (Cair_DL), which is calculated from downlink air quality of all modems, priority and service type of all traffic flows.

Uplink air interface capacity at time t (Cair_UL), which is calculated from uplink air quality of all modems, priority and service type of all traffic flows.

Downlink air traffic rate Tair_DL at time t.

Uplink air traffic rate Tair_UL at time t.

Downlink committed air traffic rate Rc_DL at time t.

Uplink committed air traffic rate Rc_UL at time t.

On the basis of measured parameters, four indicators are calculated (202):

Downlink air interface utilization Uair_DL, which is obtained by performing a moving average calculation for Tair_DL and dividing the result by Cair_DL.

Uplink air interface utilization Uair_UL, which is obtained by performing a moving average calculation for Tair_UL and dividing the result by Cair_UL.

Relative committed downlink traffic rate (Rrel_DL), which is obtained by dividing the Rc_DL by Cair_DL.

Relative committed uplink traffic rate (Rrel_UL), which is obtained by dividing the Rc_UL by Cair_UL.

Following the described calculations, a decision is made about the state of the base station (203, 204). Preconfigured thresholds Downlink air interface utilization threshold, Uplink air interface utilization threshold, Downlink air interface utilization hysteresis and Uplink air interface utilization hysteresis are utilized in deciding the state of the congestion. The base station enters in a congested state as soon as any of the described indicators Uair_DL, Uair_UL, Rc_DL and Rc_UL crosses the respective preconfigured threshold (500). The procedure is described in more detail below. When Downlink air interface utilization (Uair_DL) (503) crosses the Downlink Air interface utilization threshold (504), the base station enters into congested state (506). In the same manner, the base station enters into congested state when Uplink air interface utilization (Uair_UL) crosses the Downlink Air interface utilization threshold, OR when Relative committed downlink traffic rate (Rrel_DL) crosses the Downlink Air interface utilization threshold, OR when Relative committed uplink traffic rate (Rrel_UL) crosses the Uplink Air interface utilization threshold.

When the base station (103) enters the congested state (506), it informs the self-organizing network (SON) server of congestion by sending a CONGESTION_INFORM message (205).

The SON server receives the CONGESTION_INFORM message (301), calculates a dense neighbor list (302) and responds to the congested base station by sending the dense neighbor list (303). In the next step, the SON server recalculates handover trigger configuration (304), which promotes handovers from the congested base station to neighboring base stations, and sends it to the congested base station (305). Finally, the SON server updates the neighbor lists by excluding the congested base station (306) and sends them to all neighboring base stations (307). By sending the updated list to neighboring base stations, the list is propagated to mobile stations, which won't scan and initiate handover to the congested base station.

As a consequence of providing a denser neighbor list and removing the congested station from the neighboring stations' lists, the mobile terminals don't initiate handovers to the congested base station, but instead find other handover opportunities. As a result, the congestion gradually clears.

The base station exits the congested state (507) when all four indicators drop below the respective hysteresis thresholds (505), i.e., when the Downlink air interface utilization ($Uair\_DL$) (503) drops below the Downlink Air interface utilization hysteresis AND the Uplink air interface utilization ($Uair\_UL$) drops below the Uplink Air interface utilization hysteresis AND the Relative committed downlink traffic rate ($Rrel\_DL$) drops below the Downlink Air interface utilization hysteresis AND the Relative committed uplink traffic rate ($Rrel\_UL$) drops below the Uplink Air interface utilization threshold.

When the base station exits the congested state, it sends the SON server a CONGESTION_RELEASE message (206). The SON server receives the CONGESTION_RELEASE message (401), generates a sparse neighbor list (402) and sends it to the previously congested base station (403). Next, the SON server calculates new handover triggers (404) and sends them to the previously congested base station (405). Finally, the SON server generates neighbor lists for the neighboring base stations and includes the previously congested base station back into the list (406); the SON server sends (407) the generated lists to the neighboring base stations (104, 105).

The invention claimed is:

1. A method for congestion avoidance in 4G networks, comprising:
   a) congestion detection, wherein congestion detection comprises:
      measuring parameters of uplink air interface utilization, downlink air interface utilization, relative committed uplink rate and relative committed downlink rate; and
      using pairs of thresholds (hysteresis) to decide whether congestion has occurred; and
   b) congestion avoidance procedure.

2. The method of claim 1, where congestion avoidance procedure comprises the following steps:
   a) entering a congested state,
   b) exiting the congested state.

3. The method of claim 2, where entering the congested state comprises the following steps:
   a) a base station informing a self-organizing network (SON) server the congestion by sending a CONGESTION_INFORM message,
   b) the SON server receiving the CONGESTION_INFORM message,
   c) the SON server calculating a dense neighbor list,
   d) the SON server sending the dense neighbor list to the congested base station,
   e) the SON server calculating a new handover triggers configuration,
   f) the SON server sending the calculated handover triggers to the congested base station,
   g) the SON server removing the congested base station from a neighbor list of neighboring base stations,
   h) the SON server distributing the newly generated neighbor list to all neighboring base stations.

4. The method of claim 2, where exiting the congested state comprises the following steps:
   a) a base station informing a self-organizing network (SON) server the congestion has cleared by sending a CONGESTION_RELEASE message,
   b) the SON server receiving the CONGESTION_RELEASE message,
   c) the SON server calculating a sparse neighbor list,
   d) the SON server sending the sparse neighbor list to the congested base station,
   e) the SON server calculating a new handover triggers configuration,
   f) the SON server sending the calculated handover triggers to the previously congested base station,
   g) the SON server placing the congested base station back to a neighbor list of neighboring base stations,
   h) the SON server distributing the newly generated neighbor list to all neighboring base stations.

5. A system for congestion avoidance in 4G networks, comprising:
   a processor; and
   a memory coupled with the processor, wherein the memory is configured to provide the processor with instructions which when executed cause the processor to:
      detect congestion, wherein detecting congestion comprises:
         measuring parameters of uplink air interface utilization, downlink air interface utilization, relative committed uplink rate, and relative committed downlink rate; and
         using pairs of thresholds (hysteresis) to decide whether congestion has occurred; and
      perform a congestion avoidance procedure.

6. The system of claim 5, wherein performing the congestion avoidance procedure comprises:
   entering a congested state; and
   exiting the congested state.

7. The system of claim 6, wherein entering the congested state comprises:
   informing a self-organizing network (SON) server of the congestion by sending a CONGESTION_INFORM message,
   wherein the SON server receives the CONGESTION_INFORM message,
   and wherein the SON server calculates a dense neighbor list,
   and wherein the SON server sends the dense neighbor list to the congested system,
   and wherein the SON server calculates a new handover triggers configuration,
   and wherein the SON server sends the calculated handover triggers to the congested system,
   and wherein the SON server removes the congested system from a neighbor list of neighboring base stations,
   and wherein the SON server distributes the newly generated neighbor list to all neighboring base stations.

8. The system of claim 6, wherein exiting the congested state comprises:

informing a self-organizing network server (SON) server the congestion has cleared by sending a CONGESTION_RELEASE message,
wherein the SON server receives the CONGESTION_RELEASE message,
and wherein the SON server calculates a sparse neighbor list,
and wherein the SON server sends the sparse neighbor list to the congested system,
and wherein the SON server calculates a new handover triggers configuration,
and wherein the SON server sends the calculated handover triggers to the previously congested system,
and wherein the SON server places the congested system back to a neighbor list of neighboring base stations,
and wherein the SON server distributes the newly generated neighbor list to all neighboring base stations.

9. A method for congestion avoidance in 4G networks, comprising:
 detecting congestion; and
 performing a congestion avoidance procedure, wherein the congestion avoidance procedure comprises:
  entering a congested state; and
  exiting the congested state;
 wherein entering the congested state comprises:
  a base station informing a self-organizing network (SON) server of the congestion by sending a CONGESTION_INFORM message;
  the SON server receiving the CONGESTION_INFORM message;
  the SON server calculating a dense neighbor list;
  the SON server sending the dense neighbor list to the congested base station;
  the SON server calculating a new handover triggers configuration;
  the SON server sending the calculated handover triggers to the congested base station;
  the SON server removing the congested base station from a neighbor list of neighboring base stations; and
  SON server distributing the newly generated neighbor list to all neighboring base stations.

10. The method of claim 9, wherein detecting congestion comprises:
 measuring parameters of uplink air interface utilization, downlink air interface utilization, relative committed uplink rate, and relative committed downlink rate; and
 using pairs of thresholds (hysteresis) to decide whether congestion has occurred.

11. The method of claim 9, wherein exiting the congested state comprises:
 the base station informing the SON server the congestion has cleared by sending a CONGESTION_RELEASE message;
 the SON server receiving the CONGESTION_RELEASE message;
 the SON server calculating a sparse neighbor list;
 the SON server sending the sparse neighbor list to the congested base station;
 the SON server calculating a new handover triggers configuration;
 the SON server sending the calculated handover triggers to the previously congested base station;
 the SON server placing the congested base station back to a neighbor list of neighboring base stations; and
 the SON server distributing the newly generated neighbor list to all neighboring base stations.

12. A method for congestion avoidance in 4G networks, comprising:
 detecting congestion, and
 performing a congestion avoidance procedure, wherein the congestion avoidance procedure comprises:
  entering a congested state, and
  exiting the congested state;
 wherein exiting the congested state comprises:
  a base station informing a self-organizing network (SON) server the congestion has cleared by sending a CONGESTION_RELEASE message;
  the SON server receiving the CONGESTION_RELEASE message;
  the SON server calculating a sparse neighbor list;
  the SON server sending the sparse neighbor list to the congested base station;
  the SON server calculating a new handover triggers configuration;
  the SON server sending the calculated handover triggers to the previously congested base station;
  the SON server placing the congested base station back to a neighbor list of neighboring base stations; and
  the SON server distributing the newly generated neighbor list to all neighboring base stations.

13. The method of claim 12, wherein detecting congestion comprises:
 measuring parameters of uplink air interface utilization, downlink air interface utilization, relative committed uplink rate and relative committed downlink rate; and
 using pairs of thresholds (hysteresis) to decide whether congestion has occurred.

14. The method of claim 12, wherein entering the congested state comprises:
 the base station informing the SON server of the congestion by sending a CONGESTION_INFORM message;
 the SON server receiving the CONGESTION_INFORM message;
 the SON server calculating a dense neighbor list;
 the SON server sending the dense neighbor list to the congested base station;
 the SON server calculating a new handover triggers configuration;
 the SON server sending the calculated handover triggers to the congested base station;
 the SON server removing the congested base station from a neighbor list of neighboring base stations; and
 the SON server distributing the newly generated neighbor list to all neighboring base stations.

* * * * *